United States Patent [19]
Yoshida

[11] Patent Number: 5,357,514
[45] Date of Patent: Oct. 18, 1994

[54] DISTRIBUTED BIT-BY-BIT DESTUFFING CIRCUIT FOR BYTE-STUFFED MULTIFRAME DATA

[75] Inventor: Norio Yoshida, Tokyo, Japan
[73] Assignee: NEC Corporation, Tokyo, Japan
[21] Appl. No.: 832,893
[22] Filed: Feb. 10, 1992

[30] Foreign Application Priority Data

Feb. 8, 1991 [JP] Japan .................................. 3-039332
Mar. 25, 1991 [JP] Japan .................................. 3-086104

[51] Int. Cl.$^5$ ............................................. H04J 3/07
[52] U.S. Cl. .................................. 370/102; 370/105.1; 375/112
[58] Field of Search ...................... 370/102, 108, 105.1, 370/100.1, 105.3, 105.2, 105; 375/112, 118, 120, 110, 111

[56] References Cited

U.S. PATENT DOCUMENTS

| | | | |
|---|---|---|---|
| 4,811,340 | 3/1989 | McEachern et al. | 370/102 |
| 4,847,875 | 7/1989 | Choi | 375/112 |
| 4,928,275 | 5/1990 | Moore et al. | 370/102 |

Primary Examiner—Douglas W. Olms
Assistant Examiner—Huy D. Vu
Attorney, Agent, or Firm—Sughrue, Mion, Zinn, Macpeak & Seas

[57] ABSTRACT

In a byte destuffing circuit, a received data signal in a byte interleaved multiple frame structure is stored into a buffer memory, and a clock sequence is recovered. The recovered line clock is applied to a write address generator for storing the data on a per byte basis into a buffer memory. In response to a destuffing control signal, the write address generator suspends the generation of a write address if positive byte stuffing is effected at the transmit end, and destuffing is effected on the recovered clock sequence on a bit-by-bit basis during successive eight frames. The destuffed clock sequence is applied to a phase comparator for comparison with a local clock sequence generated by a VCO which is controlled by the phase comparator in a phase-locked loop. The local clock sequence is used to drive a read address generator for reading data from the buffer memory on a per byte basis.

6 Claims, 6 Drawing Sheets

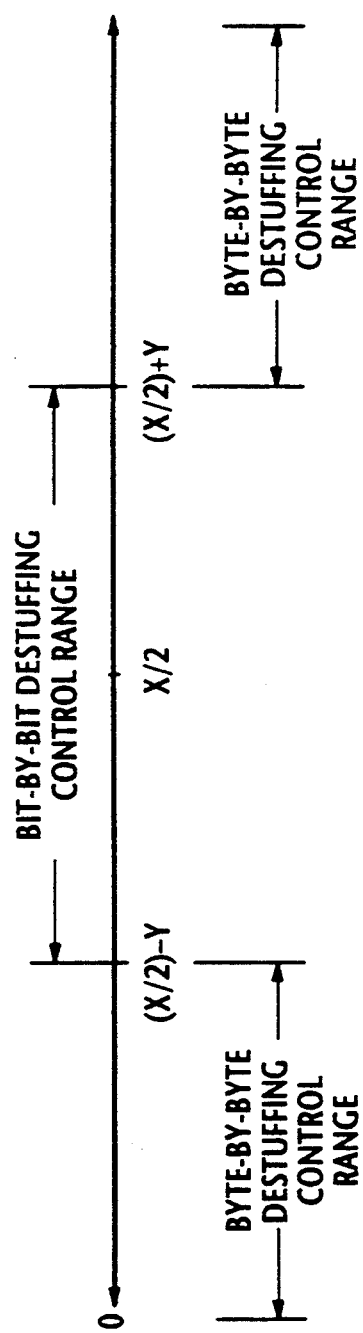

DISTRIBUTED BIT-BY-BIT DESTUFFING CIRCUIT FOR BYTE-STUFFED MULTIFRAME DATA

BACKGROUND OF THE INVENTION

The present invention relates generally to byte destuffing circuits for time division multiplexed digital signals.

Although it is generally intended that digital equipment be synchronized to each other or to a common clock, allowances must be made for the interworking of equipment that operates with slightly different clocks using elastic store. In SONET (Synchronous Optical NETwork) in which the signal is in byte interleaved multiple frame structure, positive and negative byte stuffing techniques are employed for frequency justification.

In a typical byte destuffing circuit, a buffer memory is provided for storing received data. Line clock is recovered from the received data and a write address generator is driven by the line clock to store each byte of the received data. A local clock is generated by a voltage-controlled oscillator to drive a read address generator for reading each byte of stored data. The read and write addresses are compared with each other by a phase comparator to generate a VCO control signal to synchronize the local clock with the line clock. A destuffing control signal is derived from a stuff byte multiplexed with the incoming signal. The write address generator is responsive to the destuffing control signal for destuffing eight successive pulses of line clock to suspend the generation of a write address for a byte location if a positive byte stuffing is effected at the transmit end.

However, one serious problem is that the phase comparator develops a large voltage change when the line clock is destuffed and there is a corresponding large frequency fluctuation in the local clock, resulting in a substantial amount of jitter in the data output of the buffer memory.

SUMMARY OF THE INVENTION

It is therefore an object of the present invention to provide a byte destuffing circuit which eliminates jitter in the output data of a butter memory.

According to the present invention, a byte destuffing circuit receives a data signal in a byte interleaved multiple frame structure, recovers a clock sequence and derives a destuffing control signal from a stuff byte contained in the signal. In response to the destuffing control signal, destuffing of a byte is effected by distributing one-bit destuffing operations on the recovered (line) clock sequence during each of successive eight fames. The destuffed clock sequence is applied to a phase comparator in which it is compared with a read clock sequence generated by a voltage-controlled oscillator according to a difference detected by the phase comparator. The recovered clock sequence is applied to a write address generator for generating a write address signal for each byte of the data signal and supplying it to buffer memory for storing the data signal. The for suspending the generation of a write address when the destuffing control signal is positive. The read clock sequence is applied to a read address generator for generating a read address for each byte of the data signal and supplying it to the buffer memory for reading data signals therefrom.

In modified embodiment, the rate of occurrences of the destuffing control signal over a predetermined number of preceding frames is determined, and the destuffing of a variable number of bits is effected on the recovered clock sequence as a function of the determined rate during each of the same number of subsequent frames.

To prevent memory slips, an address comparator is provided for detecting a difference between the write and addresses. When the difference is outside of a predefined range, bit-by-bit destuffing control is disabled, and the recovered clock sequence is destuffed in accordance with the difference detected by the address comparator.

BRIEF DESCRIPTION OF THE DRAWINGS

The present invention will be described in further detail with reference to the accompanying drawings, in which:

FIG. 6 shows ranges of bit-by-bit and byte-by-byte control operations associated with the embodiment of FIG. 5.

DETAILED DESCRIPTION

Figure 1:
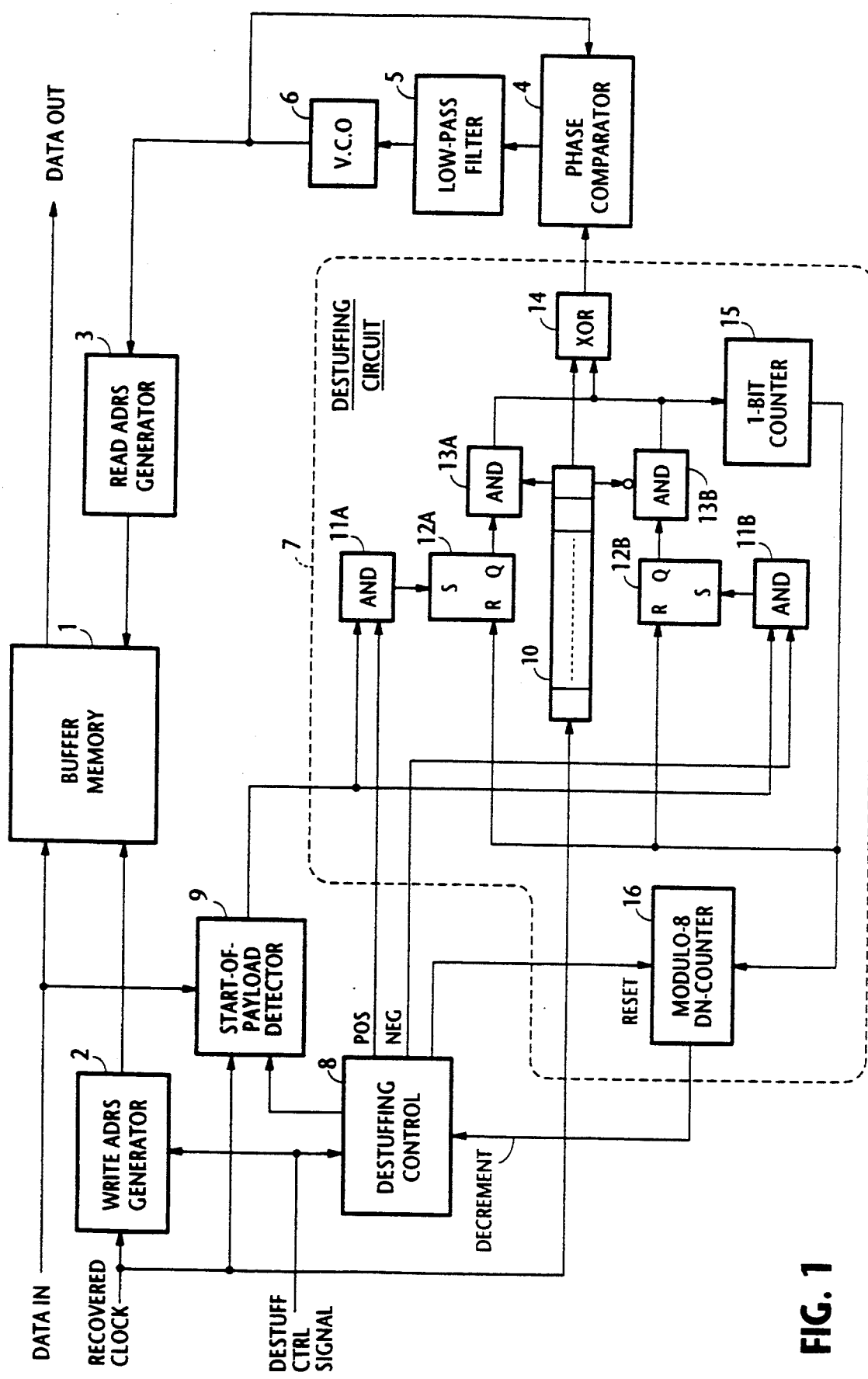
FIG. 1 is a block diagram of a byte destuffing circuit according to a first embodiment of the present invention.

In a byte destuffing circuit for a SONET (synchronous Optical Network) system, represent in FIG. 1, receives byte interleaved multiple frame structure and extracts clock timing signal and a destuff control signal from the received signal. A positive destuff control signal is generated when positive byte stuffing is accomplished at the transmit end by sending an extra byte, and a negative destuff control signal is generated when negative byte stuffing is effected by skipping one information time slot.

The destuffing circuit comprises a buffer memory 1, a write address generator 2, and a read address generator 3. Write address generator 2 is responsive to the recovered clock timing signal to generate a write address for writing received data signals into buffer memory 1. If a positive stuff byte is detected, write address generator 2 responds to the corresponding destuff control signal by suspending the generation of an address for the purposely inserted byte so that the latter is effectively eliminated from the sequence of received data bit stream. If a negative stuff byte is detected, write address generator 2 simply responds to it by generating a write address for the skipped time slot.

Read address generator 3 uses the output of a voltage-controlled oscillator 6 as a read clock to read out data from buffer memory 1. The VCO control signal is derived through a low-pass filter 5 from the output of a phase comparator 4 in which the output of VCO 6 is compared with clock pulses supplied from a destuffing circuit 7.

A destuffing controller 8 and a start-of-payload (information) detector 9 are provided. Destuffing controller 8 stores the destuffing control signal to produce a count, and determines the type (positive or negative) of destuffing to be effected to produce a positive or negative destuffing command. Start-of-payload detector 9 is enabled by destuffing controller 8 as long as a destuffing operation proceeds and examines data signals using the recovered clock timing and determines the start timing of the information payload of each SONET frame that follows its transport overhead.

According to the present invention, frame-by-frame destuffing pulse distribution is provided. As illustrated, destuffing circuit 7 comprises a shift register 10 to which the recovered clock is applied and shifted from its input end to the output end. The positive destuffing command signal from controller 8 and the output of start-of-payload detector 9 are received by an AND gate 11A to trigger a flip-flop or latch 12A to enable an AND gate 13A when positive bit destuffing is effected during each of successive eight frames. Similarly, the negative destuffing command signal from controller 8 and the output of start-of-payload detector 9 are received by an AND gate 11B to trigger a latch 12B to enable an AND gate 13B when negative bit destuffing is effected during each of successive eight frames.

The output stage of shift register 10 is connected to AND gate 13A and to an inverted input of AND gate 13B, and further to a first input of an exclusive-OR gate 14, the outputs of AND gates 13A and 13B being coupled together to a second input of exclusive-OR gate 14. A one-bit counter 15 responds to the output of each of AND gates 13A, 13B by resetting the latches 12A, 12B when a single bit is counted. If AND gate 13A is enabled, exclusive-OR gate 14 produces a binary 1 when the binary state of a bit in the output stage of shift register 10 is one and if AND gate 13B is enabled, it produces a binary 0 when the binary state of the output stage is zero. The output of exclusive-OR gate 14 is a destuffed clock pulse sequence and is applied to phase comparator 4 for comparison with read clock timing.

Destuffing circuit 7 further includes a modulo-8 down-counter 16 which is reset by controller 8 to an initial value of count "eight" when the stuff-byte count is incremented from zero to one or decremented to a value other than zero. Down-counter 16 starts decrementing its count in response to the output of 1-bit counter 15. When a single-bit destuffing operation is effected for each of eight successive frames for a given destuff control signal, a zero count is reached in down-counter 16 and a decrement command signal is applied to destuffing controller 8 from down-counter 16. In response, destuffing controller 8 decrements stored stuff-byte count value by one. The process is repeated until the stuff-byte count value is decremented to zero.

Figure 2:
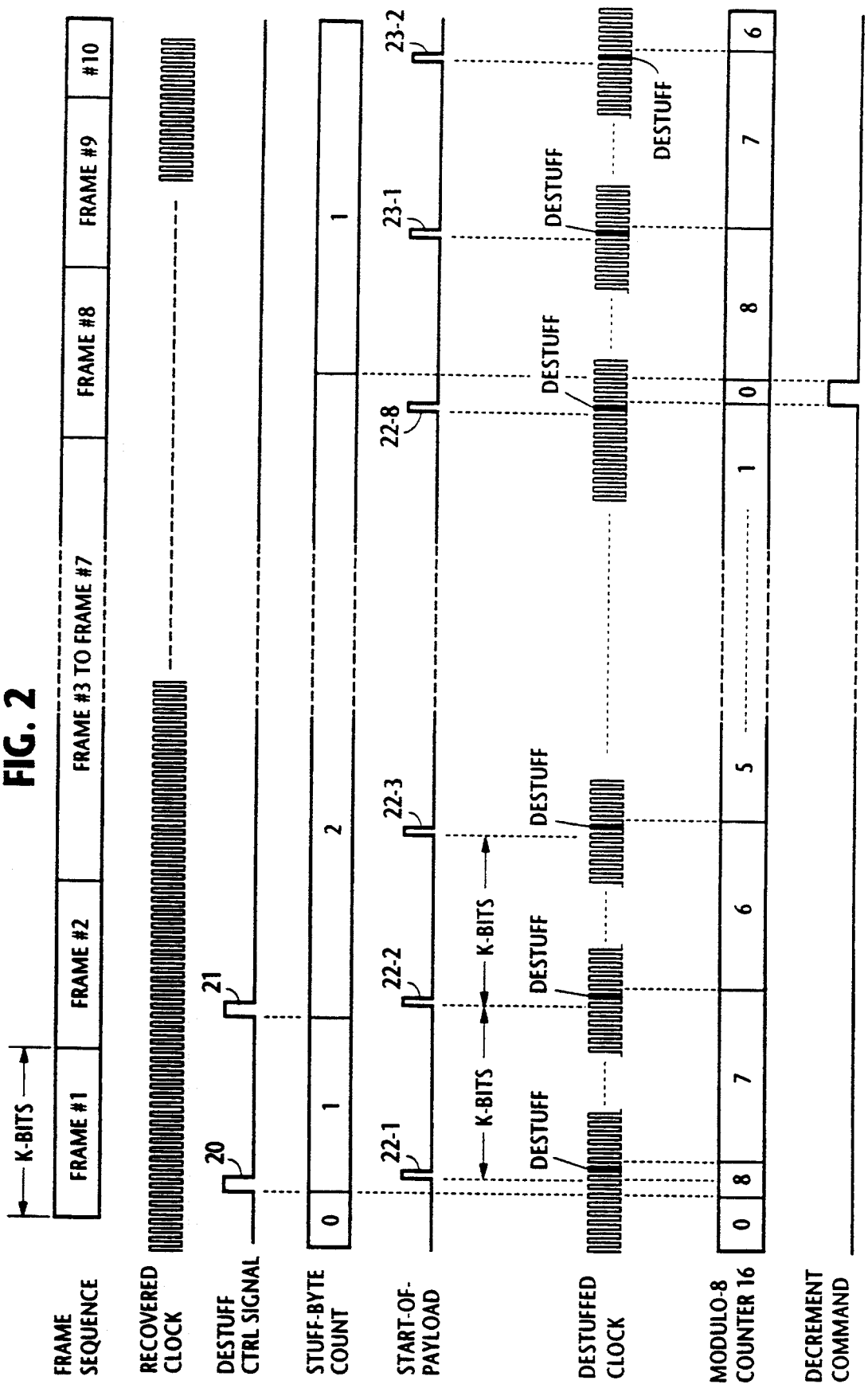
FIG. 2 is a timing diagram associated with the embodiment of FIG. 1.

The operation of the first embodiment of this invention will be best understood with reference to FIG. 2.

It is assumed that the stuff byte count is initially zero and each frame contains a maximum of K bits including overhead and payload. If a positive stuff byte is transmitted during frames #1 and #2, destuffing control signals 20 and 21 are generated and a stuff byte count is incremented successively to a count "two" by destuffing controller 7.

Corresponding to frame #1, a start-of-payload pulse 22-1 is produced by detector 9 and modulo-8 down-counter 16 is reset to the initial value "eight". The AND gate 11A is activated and latch 12A is set, enabling AND gate 13A. If the binary state at the output of shift register 10 is one, exclusive-OR gate 14 produces a binary zero and 1-bit counter 15 produces an output, resetting latch 12A and decrementing down-counter 16 to a count value "seven".

In like manner, a start-of-payload pulse 22-2 is produced corresponding to frame #2 and the AND gate 11A is again activated to store a 1 into latch 12A, enabling AND gate 13A. If the binary state at the output of shift register 10 is one, exclusive-OR gate 14 again produces a binary zero and down-counter 16 is decremented to a count "six". During subsequent frames #3 to #8, similar events take place corresponding to successive start-of-payload pulses 22-3 through 22-8 and down-counter 16 is decremented successively to zero.

A decrement command is therefore supplied from down-counter 16 to destuffing controller 8 and its stuff-byte count is decremented to one. As a result, down-counter 16 is again reset to the initial value and start-of-payload pulses 23-1 and 23-2 are produced corresponding to frames #9 and #10, successively decrementing down-counter 16 to "six". The process is repeated until the down-counter 16 is reduced to zero, whereupon the stuff-byte count is reduced to zero. In this way, a total of 16 bits are destuffed during the period of 16 successive frames.

Figure 3:
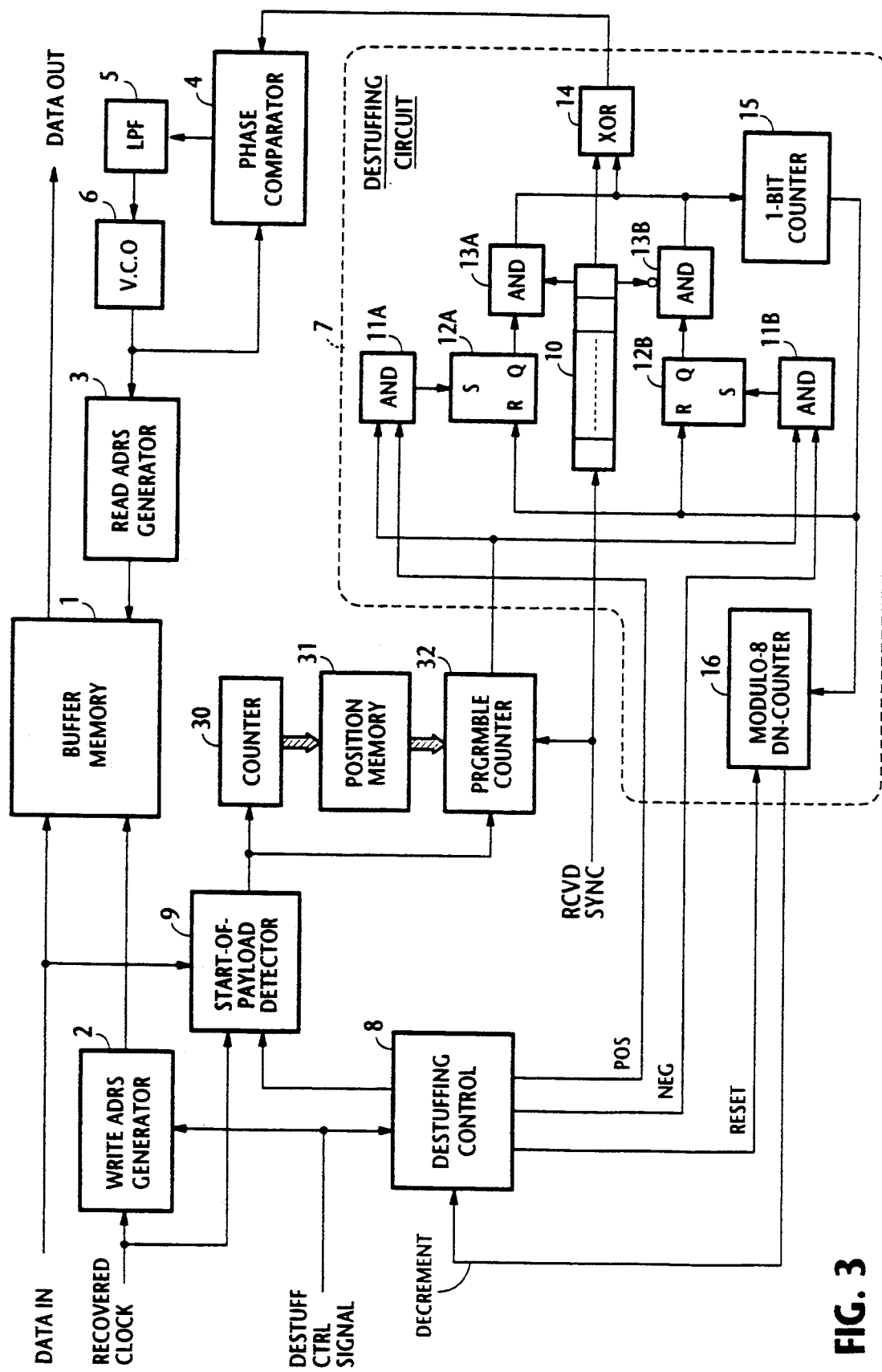
FIG. 3 is a block diagram of a modification of the previous embodiment.

With the embodiment described above, the position at which destuffing occurs is the same for all frames. FIG. 3 is a block diagram of an embodiment in which the destuffing position varies from one frame to the next. This embodiment is generally similar to the previous embodiment except that it additionally includes a counter 30 which is responsive to the output of start-of-payload detector 9 to generate a successive binary count value which varies with successive frames. For each of these binary count values a unique bit position ($M_i$, where $i = 1, 2, \ldots 8$) is stored in a position memory 31. In response to each output of counter 30, a bit-position signal is uniquely generated by memory 31 and supplied to a programmable counter 32 as a preset count value. The output of start-of-payload detector 9 is also fed to programmable counter 32 as a reset pulse to cause it to start counting the recovered clock. Programmable counter 32 produces an output when the preset value is reached. The output of programmable counter 32 is applied to AND gates 11A and 11B as a destuffing command pulse.

Figure 4:
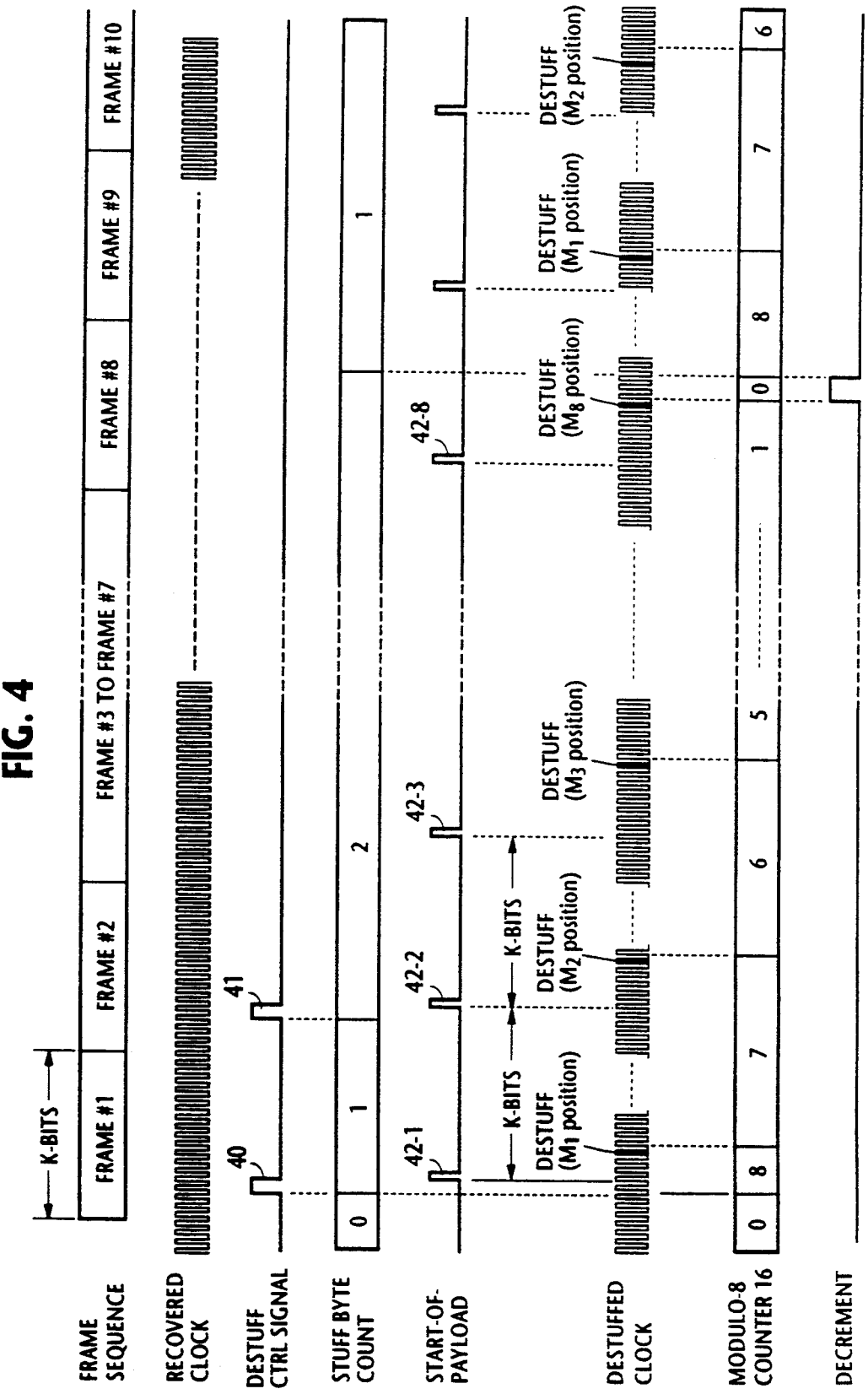
FIG. 4 is a timing diagram associated with the embodiment of FIG. 3.

As shown in FIG. 4, corresponding to start-of-payload pulses 42-1, 42-2, 42-3 . . . 42-8, destuffing occurs at $M_1$, $M_2$, $M_3$ . . . $M_8$ positions of frames #1, #2, #3 . . . #8, respectively, for frames #1 through #8 in response to destuff control signal 40. The same process is repeated if destuff control signal 41 is successively generated.

Figure 5:
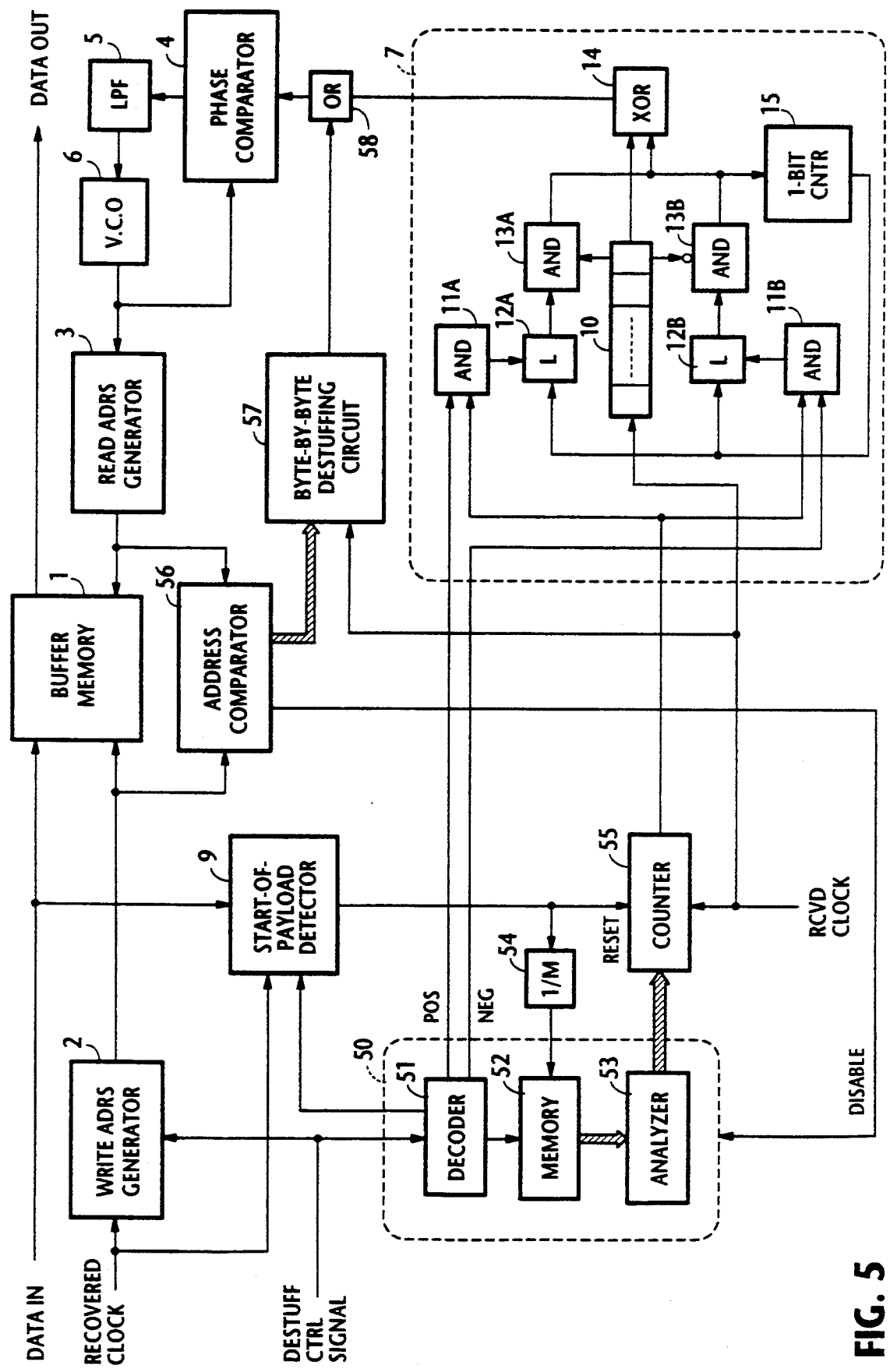
FIG. 5 is a block diagram of a further modification of the present invention.

A further modification of this invention is shown in FIG. 5 in which the number of bits to be destuffed in a frame is determined by analyzing the number of stuff bytes which has been received during a predetermined number of successive frames. This embodiment includes a destuffing controller 50 which includes a decoder 51, a memory 52 and an analyzer 53. Decoder 51 determines which mode of destuffing is to be performed, and stores the destuffing control signal into memory 52. Memory 52 is cleared at M-frame intervals by a divide-by-M counter 54 coupled to the output of start-of-payload detector 9. Analyzer 53 gives a total ($=N$) of destuffing control signals which are stored during M frames and supplies a position signal as a preset count to a counter 55 which is reset in response to the start-of-payload pulse for start counting clock. Counter 55 produces an output when the present value is attained and supplies it to the AND gates 11A, 11B of destuffing circuit 7. This position signal is so determined that the output of counter 55 occurs at M/(8×N) frame intervals. If M=8 and N=2, counter 55 generates an output at ⅛ frame intervals, and hence two bits will be destuffed in each frame during the period of eight successive frames. The destuffed clock is clock-synchronized with the data signal stored in the buffer memory 1. Thus, the destuffing circuit is in a frequency control mode when responding to the output of the destuffing controller 50.

Further provided is an address comparator 56 which is connected between the outputs of write address generator 2 and read address generator 3. Address comparator 56 detects the difference between the read and write addresses and checks to see if the difference is outside of a range defined between (X/2)−Y and (X/2)+Y, where X represents the maximum size of buffer memory 1, Y representing an arbitrary threshold value as illustrated in FIG. 6. If the address difference is outside of the defined range, address comparator 56 disables the destuffing controller 50 and supplies a destuffing control signal to a known byte-by-byte destuffing circuit 57 whose output is coupled through an OR gate 58 to comparator 4. Since the address difference is an integral multiple of a byte, the phase-control by address comparator 56 prevents overflows or underflows of buffer memory 1, often referred to as "slips", which may be caused by a rapid change in the line clock or due to initialization of memory 52 at startup periods.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A byte destuffing circuit for receiving a data signal in a byte interleaved multiple frame structure, recovering a clock sequence from the received data signal and deriving a destuffing control signal from a stuff byte contained in said data signal, comprising:

a buffer memory;

a write address generator for generating a write address signal for each byte of said data signal and supplying the write address to said memory in response to the recovered clock sequence for storing said data signal into the memory, said write address generator being responsive to said destuffing control signal for suspending the generation of a write address when said destuffing control signal is positive;

destuffing means responsive to said destuffing control signal for effecting the destuffing of a bit on said recovered clock sequence during each of successive eight frames, said destuffing means comprising means for counting occurrences of said destuffing control signal and producing therefrom a stuff-byte count, bit-by-bit destuffing circuit means for destuffing a bit on said recovered clock sequence during each of successive eight frames when said stuff-byte count is equal to or greater than one, and reset means arranged to start counting the destuffed bit to produce a destuffed-bit count when the stuff count increases from zero to one or decreases from N to M (where N is greater than M and M is equal to or greater than one) and decrementing said stuff-byte count by one when the destuffed-bit count reaches a predetermined value;

a phase comparator for making a phase comparison between the destuffed clock sequence and a read clock sequence;

a voltage-controlled oscillator responsive to a phase difference detected by said phase comparator for generating said read clock sequence; and a read address generator for generating a read address for each byte of said data signal and supplying the read address to said buffer memory in response to said read clock sequence for reading said data signal from said buffer memory.

2. A byte destuffing circuit as claimed in claim 1, wherein the position at which the recovered clock sequence is destuffed varies from one frame to another.

3. A byte destuffing circuit for receiving a data signal in a byte interleaved multiple frame structure, recovering a clock sequence from the received data signal and deriving a destuffing control signal from a stuff byte contained in said data signal, comprising:

a buffer memory;

a write address generator for generating a write address signal for each byte of said data signal and supplying the write address to said memory in response to the recovered clock sequence for storing said data signal into the memory, said write address generator being responsive to said destuffing control signal for suspending the generation of a write address when said destuffing control signal is positive;

destuffing means responsive to said destuffing control signal for effecting the destuffing of a bit on said recovered clock sequence during each of successive eight frames, said destuffing means comprising means for counting occurrences of said destuffing control signal and producing thereform a stuff-byte count, pulse generating means for generating a pulse in a time position of a frame which is unique to each of successive eight frames when said stuff-byte count is equal to or greater than one, bit-by-bit destuffing circuit means for destuffing a bit on said recovered clock sequence in response to said pulse from the pulse generating means, and reset means arranged to start counting said destuffed bit to produce a destuffed-bit count when the stuff-byte count increases from zero to one or decreases from N to M (where N is greater than M and M is equal or greater than one) and decrementing said stuff-byte count by one when the destuffed-bit count reaches a predetermined value;

a phase comparator for making a phase comparison between the destuffed clock sequence and a read clock sequence;

a voltage-controlled oscillator responsive to a phase difference detected by said phase comparator for generating said read clock sequence; and a read address generator for generating a read address for each byte of said data signal and supplying the read address to said buffer memory in response to said read clock sequence for reading said data signal form said buffer memory.

4. A byte destuffing circuit as claimed in claim 3, wherein said pulse generating means comprises:

position memory means for storing a plurality of position data each indicating a unique bit position within a frame;

means for reading the position data from the memory means at frame intervals when said stuff count is equal to or greater than one; and programmable counter means arranged to be preset to said position data for counting clock pulses of said recovered clock sequence to produce a clock count and generating an output signal when the clock count is equal to the preset position data and applying said output signal to said bit-by-bit destuffing circuit as said pulse.

5. A byte destuffing circuit as claimed in claim 1, wherein said destuffing means comprises means for determining the rate of occurrences of said destuffing control signal over a predetermined number of preceding frames, and effecting the destuffing of a variable number of bits on said recovered clock sequence as a function of said determined rate during each of said predetermined number of subsequent frames.

6. A byte destuffing circuit as claimed in claim 1 or 5, further comprising an address comparator for detecting a difference between said write address and said read address, disabling said destuffing means when said difference is outside of a predefined range, and destuffing said recovered clock sequence on a byte-by-byte basis in accordance with said difference.

* * * * *

UNITED STATES PATENT AND TRADEMARK OFFICE
CERTIFICATE OF CORRECTION

PATENT NO. : 5,357,514
DATED : January 9, 1995
INVENTOR(S) : YOSHIDA

It is certified that error appears in the above-identified patent and that said Letters Patent is hereby corrected as shown below:

Col. 1, line 64, after "The" insert --write address generator is further responsive to the destuffing control signal--.

Col. 2, line 11, after "and" insert --read--.

Signed and Sealed this

Fourteenth Day of February, 1995

Attest:

BRUCE LEHMAN

Attesting Officer

Commissioner of Patents and Trademarks